(12) United States Patent
Lee et al.

(10) Patent No.: US 6,490,346 B2
(45) Date of Patent: Dec. 3, 2002

(54) APPARATUS AND METHOD FOR PROVIDING MUSIC-ON-HOLD SERVICE IN KEY TELEPHONE SYSTEM

(75) Inventors: Tae-Gyu Lee, Taegukwangyok-shi (KR); Jeong-Woo Lee, Kyongsangbuk-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/426,925

(22) Filed: Oct. 22, 1999

(65) Prior Publication Data

US 2001/0043692 A1 Nov. 22, 2001

(30) Foreign Application Priority Data

Jun. 18, 1999 (KR) .............................. 99-22901
Oct. 24, 1999 (KR) .............................. 99-44748

(51) Int. Cl.[7] .......................... H04M 1/64; H04M 1/00; H04M 3/42
(52) U.S. Cl. .................. 379/162; 379/67.1; 379/84; 379/157; 379/165; 379/215.01
(58) Field of Search ................. 379/156, 157, 379/162, 163, 164, 165, 214, 234, 93.07, 90.01, 93.05, 215, 67.1, 84, 215.01

(56) References Cited

U.S. PATENT DOCUMENTS

| 4,588,865 | A | * | 5/1986 | Hestad ................. 379/156 |
| 5,317,631 | A | * | 5/1994 | Chen .................... 379/164 |
| 5,420,860 | A | * | 5/1995 | Stevens et al. .......... 370/62 |
| 5,592,473 | A | * | 1/1997 | Matern et al. .......... 370/264 |
| 5,960,065 | A | * | 9/1999 | Beck et al. ........... 379/93.07 |
| 6,118,861 | A | * | 9/2000 | Gutzmann et al. ...... 379/201 |
| 6,252,944 | B1 | * | 6/2001 | Hansen, II et al. ..... 379/67.1 |

* cited by examiner

Primary Examiner—Binh Tieu
(74) Attorney, Agent, or Firm—Steve Cha; Klauber & Jackson

(57) ABSTRACT

An apparatus and method for providing a music-on-hold service to an originating subscriber requesting a call connection to a busy terminating subscriber in a key telephone system, using an external music-on-hold source coupled to a previously selected central office line port of a central office line circuit to provide a pre-recorded melody.

9 Claims, 3 Drawing Sheets

Figure 1:
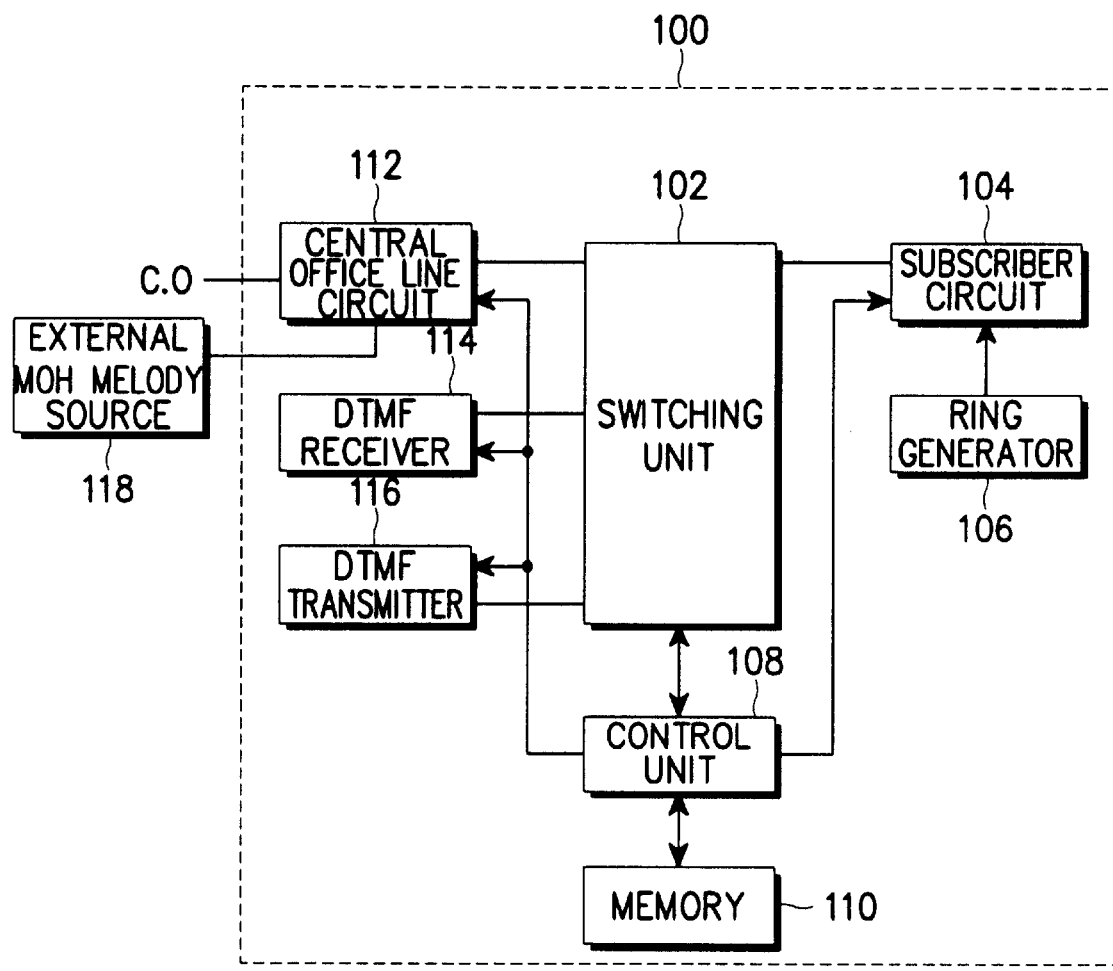

APPARATUS AND METHOD FOR PROVIDING MUSIC-ON-HOLD SERVICE IN KEY TELEPHONE SYSTEM

CLAIM OF PRIORITY

This application makes reference to, incorporates the same herein, and claims all benefits accruing under 35 U.S.C. §119 arising from an application entitled, APPARATUS AND METHOD FOR PROVIDING MUSIC-ON-HOLD SERVICE IN KEY TELEPHONE SYSTEM, filed earlier in the Korean Industrial Property Office on Oct. 24, 1998, and there duly assigned Ser. No. 1998-44748.

BACKGROUND OF THE INVENTION

1. Field of the Invention

The present invention relates to a key telephone system, and more particularly to an apparatus and method for providing a music-on-hold (MOH) service in a key telephone system.

2. Description of the Related Art

Generally, a key telephone system has a music-on-hold (MOH) feature for transmitting a pre-recorded MOH melody to a call originator requesting a connection using a melody transmitter provided in the key telephone system. The pre-recorded MOH melody is played when an incoming call is being conversed into a designated extension of a phone line or a central office line associated with the incoming call, or when the extension directed by the incoming call is busy. As the originator of an incoming call hears the transmitted melody, he or she can recognize whether the state in which the calling signal is conversed into: a) the designated extension; b) the central office line; or, c) a busy extension. Hearing such MOH melody, he or she could reduce tedious waiting while the call connection is being made to the central office line or to a specific telephone line.

Conventional key telephone systems are equipped with additional hardware to provide such MOH melody, which causes high manufacturing cost. In addition, it is necessary to use separate jacks and reduce the number of subscriber's lines to be placed in the key telephone system due to the additional hardware requirement.

SUMMARY OF THE INVENTION

Accordingly, the object of the present invention is to provide an apparatus and a method for providing an MOH service in a key telephone system without using any separate hardware, such as an MOH melody transmitter.

According to one aspect of the invention, the present invention provides an apparatus for providing an external music-on-hold service in a key telephone system of the type having a central office line circuit for reserving a central office line, thereby forming a central office communication loop; an external music-on-hold melody source connected to the reserved central office line port via the central office line circuit, the external music-on-hold melody source serving to transmit a pre-recorded MOH melody via the reserved central office line port connected thereto; and, a control unit for connecting an incoming call externally received via the central office line circuit to the reserved central office line port coupled to the external music-on-hold melody source when a central office line or extension associated with the incoming call is busy, thereby allowing the previously recorded music-on-hold melody to be transmitted.

According to another aspect of the invention, the present invention provides a method for providing a music-on-hold service in a key telephone system connected to an external music-on-hold service via a central office line port, the method comprising the following steps: (a) in response to an incoming call externally received to the key telephone system via a central office line circuit, checking whether or not a central office line or extension associated with the incoming call is busy; (b) if it is determined in step (a) that the central office line or extension is busy, then checking whether a music-on-hold service for the key telephone system has been set; and (c) if it is determined in step (b) that the music-on-hold service has been set, then connecting the incoming call to the central office line port coupled to the external music-on-hold service, and transmitting a pre-recorded music-on-hold melody for providing the music-on-hold service.

A BRIEF DESCRIPTION OF THE DRAWINGS

Figure 2:
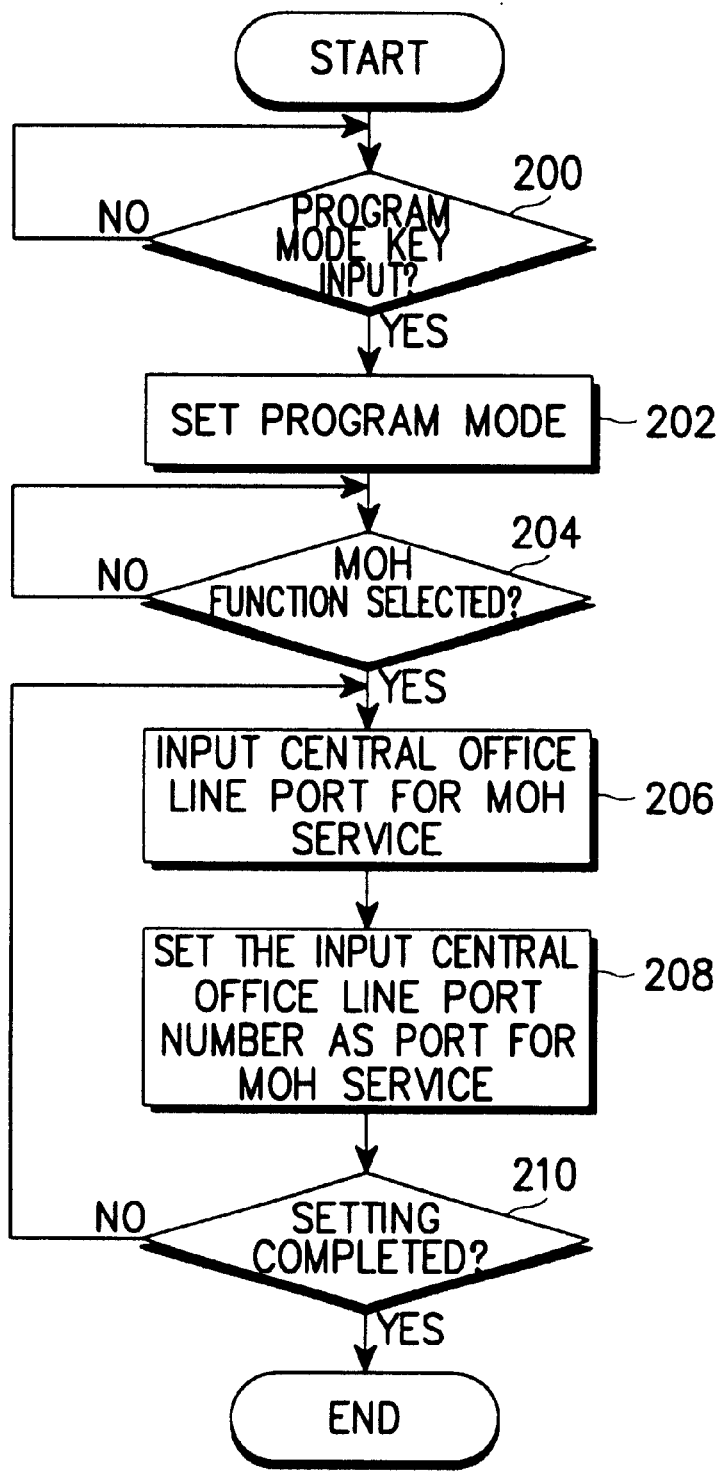
Figure 3:
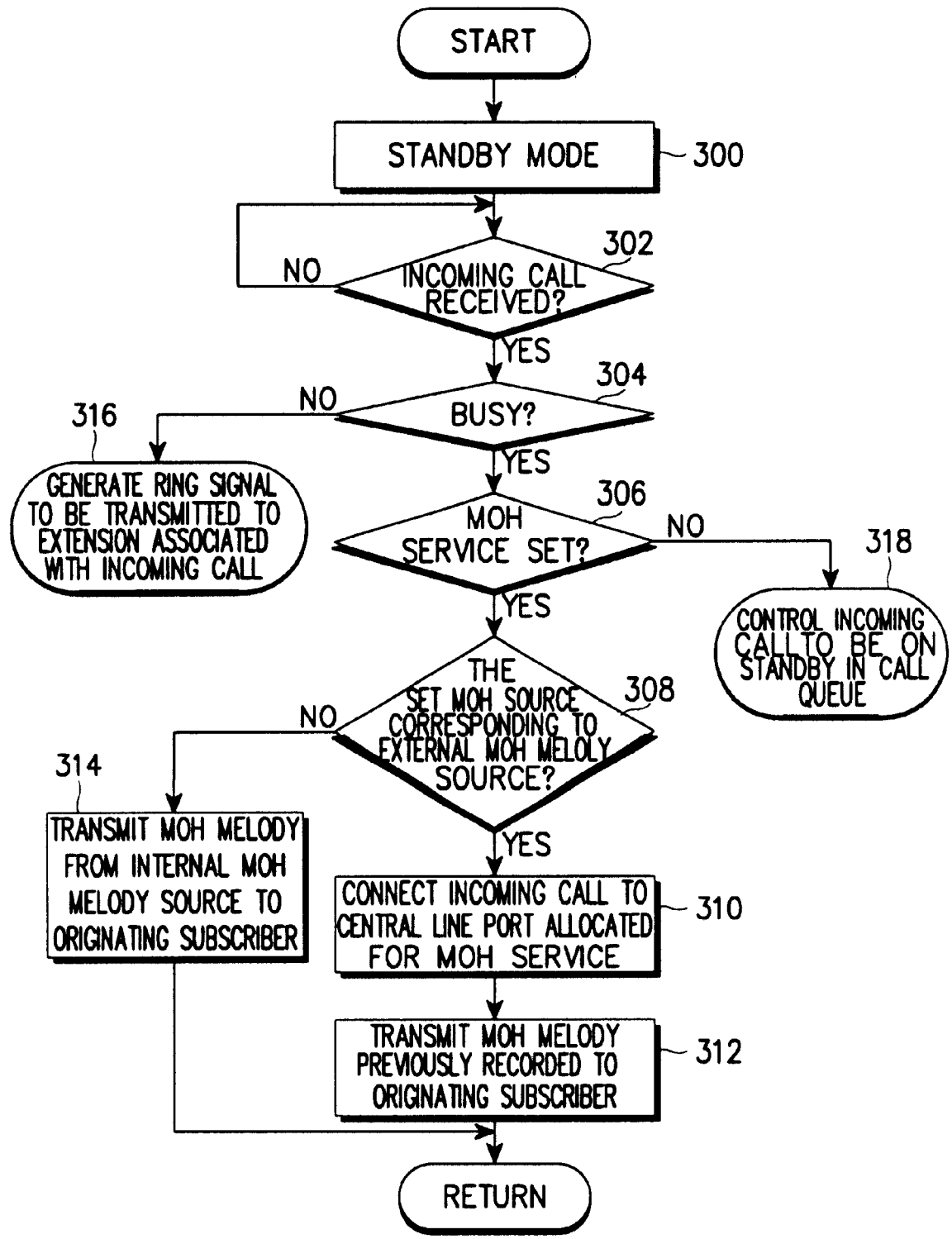

The foregoing and other objects, features, and advantages of the present invention will become more apparent from the following detailed description when taken in conjunction with the accompanying drawings in which:

FIG. 1 is a block diagram illustrating a key telephone system equipped with an external MOH melody source in accordance with an embodiment of the present invention;

FIG. 2 is a flow chart illustrating a procedure for allocating a selected office line port as a port for transmitting an MOH melody from the external MOH melody source in accordance with an embodiment of the present invention; and FIG. 3 is a flow chart illustrating a procedure for transmitting an MOH melody through the central office line port connected to the external MOH melody source in accordance with an embodiment of the present invention.

A DETAILED DESCRIPTION OF THE PREFERRED EMBODIMENT

In the following description made in conjunction with preferred embodiments of the present invention, a variety of specific details such as various concrete processing flows is described. A description of such details has been made only for a better understanding of the present invention. Those skilled in the art will appreciate that the present invention can be implemented without using the above mentioned specific details. For the purpose of clarity, a detailed description of the known functions and configurations incorporated herein will be omitted so as not to obscure the subject matter of the present invention.

FIG. 1 is a block diagram illustrating the configuration of a key telephone system according to an embodiment of the present invention. Referring to FIG. 1, a control unit 108 performs a call switching control while controlling the entire operation of the key telephone system to provide a variety of services to users. A memory 110 comprising a read only memory (ROM) is provided to store the programs for executing basic calling and other functions, for example, transmission of an MOH melody, conversion of a call, rejection of a call, etc., and further stores initial service data which includes all the parameters needed to control switching between the key sets and the phone lines. The memory 110 also includes a random access memory for temporarily storing data generated during the execution of one of the selected programs stored in the ROM. A switching unit 102 serves to switch various signals used in the key telephone system under the control of the control unit 108. A subscriber circuit 104 serves to supply the communication current to one of the key or subscriber telephone sets (not shown) under the control of the control unit 108. The subscriber circuit 104 also interfaces signals between the switching unit 102 and the plurality of subscriber telephone sets. A ring generator 106 generates a ring signal to be supplied to the subscriber circuit 104.

Under the control of a control unit 108, a central office line circuit 112 reserves a central office line that is not being used to form a central office communication loop for transmitting the MOH melody. The central office line circuit 112 also serves to interface signals between the switching unit 102 and the central office lines of the central office line circuit 112.

A dual tone multi-frequency (DTMF) receiver 114 receives a DTMF signal from the central office subscriber or extension subscriber via the switching unit 102 and analyzes the received DTMF signal, and converts the information included in the DTMF signal into digital data. The digital data from the DTMF receiver 114 is transmitted to the control unit 108 via the switching unit 102. The DTMF signal supplied to the DTMF receiver 114 indicates the telephone number sent from a central office subscriber or a telephone number sent from an extension subscriber. The central office subscriber refers to the originating subscriber making the call who is connected to the key phone system through the office line, and the extension subscriber refers to the called party, the subscriber, who is the internal subscriber in the key phone system.

A DTMF transmitter 116 converts the digital data output from the control unit 108 into a DTMF signal. The DTMF signal from the DTMF transmitter 116 is sent to the switching unit 102. The DTMF signal transmitted from the DTMF transmitter 116 indicates the a telephone number of a central office subscriber, which is generated when a call is made from an extension subscriber to call a central office subscriber. An external MOH melody source 118 is coupled with the unused port of the central office line circuit for transmitting the MOH melody, such as previously recorded music, when an incoming call addresses a specific phone extension or central office line that is busy.

FIG. 2 is a flow chart illustrating a procedure for allocating one of the central office line ports as a designated port for transmitting the MOH melody from an external MOH melody source in accordance with the embodiment of the present invention. The steps depicted in FIG. 2 are programmed in the memory 110 and executed under the control of the control unit 108, and the procedure will be described in detail, in conjunction with FIGS. 1 and 2.

When an operator activates a program mode key located in the key telephone system to designate one of the unused central office line ports for providing the MOH service, the control unit 108 sets a program mode in step 202. The operator can selectively set various optional functions, including the MOL service, provided in the key telephone system. At step 204, if the operator selects the MOH melody transmitting function, the control unit 108 receives the number of a central line port, which would be used to provide the MOH service, in step 206. At step 208, the control unit 108 sets the port corresponding to the received number of the central line as a designated port to be connected to receive the external MOH melody source 118. At step 210, it is then checked whether a setting completion key for completing the setting of the central line port for the MOH service is inputted by an operator. If no setting completion key input is detected, the control unit 108 returns to step 206 in order to receive a port number. However, when the setting completion key input is detected, the procedure for setting a central line port to be connected to the external MOH melody source 118 is completed.

FIG. 3 is a flow chart illustrating a procedure for transmitting an MOH melody through the central office line port connected to the external MOH melody source in accordance with an embodiment of the present invention. The routine depicted in FIG. 3 is programmed in the memory 110 so that it is executed under the control of the control unit 108 as shown in FIG. 1. This procedure will be described in detail, in conjunction with FIGS. 1 and 3.

At step 300, the control unit 108 is in a standby mode to receive an incoming call requested by an originating subscriber. At step 302, the control unit 108 checks whether there is an incoming call received from the originating subscriber. If there is an incoming call request received from the originating subscriber, the control unit determines whether the extension or central office line associated with the incoming call is busy, in step 304. When the extension or central office line associated with the incoming call is not busy, the control unit 108 in step 316 transmits a ring signal to the associated extension or central office line in a conventional fashion in order, thereby allowing the communication between the originating subscriber and the terminating subscriber.

When it is determined in step 304 that the extension or the central office line associated with the incoming call is busy, the control unit 108 determines whether the MOH service has been set, in step 306. If the MOH service has not been set by an operator, the control unit 108 directs the incoming call simply to be on standby in a call queue while preventing any MOH melody from being transmitted to the originating subscriber, in step 318.

When it is determined in step 306 that the MOH service has been set, at step 308, the control unit 108 determines whether the MOH melody source set for the MOH service is the external MOH melody source 118 or the internal MOH melody source (not shown). The external MOH melody source 118 may include a music playback device such as a CD player, a cassette player, or other electronic devices capable of providing a similar melody. The internal MOH melody source may be a card type melody integrated circuit (IC), which is conventionally mounted in a slot of the key telephone system for providing the MOH service. If the MOH melody source is set for the external MOH melody source 118, the melody output from the external MOH melody source 118 is transmitted to the originating subscriber via the reserved central office line port coupled with the external MOH melody source 118, in step 312. The MOH melody played from the external MOH melody source 118 is to reduce tedious waiting associated with establishing a communication link between the originating subscriber and the terminating subscriber. This MOH melody may be from popular music, classic music, or a voice message such as an announcement of public information about the company. Thus, the originating subscriber can hear the MOH melody while waiting for the call connection to the terminating subscriber.

If the MOH source set for the MOH source is coupled with the internal MOH melody source, at step 314, the melody output from the internal MOH melody source is transmitted to the originating subscriber in a conventional fashion.

As it is apparent from the above description, the present invention provides a key phone system capable of allocating a central office line port that is not being used as a port for the MOH service, thereby eliminating the requirement to provide an additional hardware for providing the MOH service. As a result, the present invention helps reduce the manufacturing costs and improve the key system capacity to have more phone lines since the need for additional hardware that required a separate slot in the conventional key telephone system is eliminated. Further, it is also possible to provide a wide range of MOH melodies, as compared to the conventional key system having an internal MOH melody source.

While this invention has been described in connection with what is presently considered the most practical and preferred embodiment, it should be understood that the invention is not limited to the disclosed embodiment; to the contrary, it is intended to cover various modifications within the spirit and scope of the appended claims.

What is claimed is:

1. An apparatus for providing a music-on-hold service in a key telephone system, comprising:
    a central office line circuit for receiving a first incoming call from an originating subscriber and for selectively reserving a first central office line that is unused for forming a central office communication loop to provide said music-on-hold service:
    an external music-on-hold melody source having a pre-recorded messages therein coupled to said central office line circuit via said unused first central office line port for providing said pre-recorded messages via said reserved first central office line; and,
    a control unit for connecting said first incoming call from said originating subscriber to said reserved first central office line coupled to said external music-on-hold melody source if a second central office line of a terminating subscriber is connected to an outgoing call or a second incoming call when said first incoming call is received from said originating subscriber.

2. The apparatus as set forth in claim 1, wherein said apparatus further comprises:
    a switching unit coupled to said control unit and said central office line circuit, wherein said switching unit interfaces with said control unit and said central office line circuit;
    a receiver coupled to said switching unit for converting analog signals indicating the telephone number of one of the originating subscriber and the terminating subscriber received from said switching unit into digital signals and transmitting said converted digital signals to said control unit via said switching unit; and,
    a transmitter coupled to said switching unit for converting digital signals indicating the telephone number of one of the originating subscriber and the terminating subscriber from said control unit into analog signals and transmitting said converted analog signals to said switching unit.

3. The apparatus as set forth in claim 2, wherein said apparatus further comprises:
    a subscriber circuit coupled to said switching unit for providing a communication current to said terminating subscriber, and
    a ring generator coupled to said subscriber circuit for providing ring signals to said terminating subscriber.

4. The apparatus as set forth in claim 1, wherein said apparatus further comprises
    a memory coupled to said control unit for storing programs to execute the function of said control unit.

5. A method for providing a music-on-hold (MOH) service in a key telephone system coupled to at least an external music-on-hold service via a central office line port, the method comprising the steps of:
    (a) reserving one of the central office line ports that is unused for providing said MOH service;
    (b) checking whether a central office line of a terminating subscriber is connected to a first incoming call when a second incoming call is externally received from an originating subscriber via a central office line circuit;
    (c) determining whether said MOH service for said key telephone system has been set if it is determined at said step (b) that said central office line of said terminating subscriber is connected to said first incoming call; and,
    (d) connecting said second incoming call to a reserved unused central office line port coupled to said external music-on-hold service, and transmitting a music-on-hold melody previously recorded to said originating subscriber if it is determined at said step (c) that said MOH service has been set.

6. The method as set forth in claim 5, wherein said method further comprises the step of reserving one of the central office lines that is unused for providing said MOH service.

7. The method as set forth in claim 5, wherein said method further comprises the step of generating a ring signal to be transmitted to a terminating subscriber if it is determined that said central office line of said terminating subscriber is not connected to any incoming call.

8. The method as set forth in claim 5, wherein said method further comprises the step of setting said second incoming call to standby mode if it is determined that no MOH service has not been set.

9. The method as set forth in claim 5, wherein said method further comprises the step of providing a MOH service from an internal MOH if it is determined that said MOH service coupled to said external music-on-hold service has not been set.

* * * * *